BARRY & PRESTON.
Sad Iron.
No. 52,513.
Patented Feb. 13, 1866.
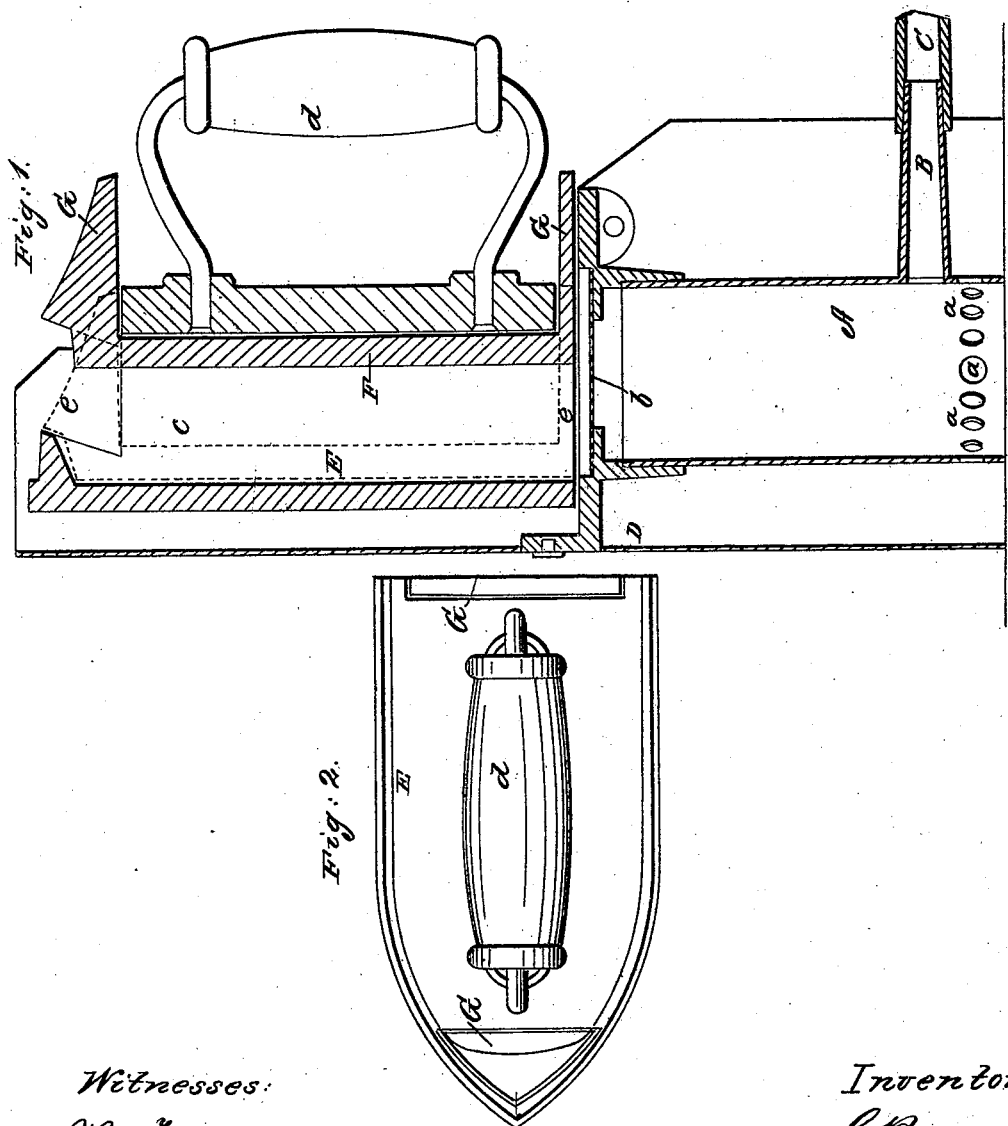

UNITED STATES PATENT OFFICE.

CHARLES BARRY AND O. W. PRESTON, JR., OF CORNING, NEW YORK.

IMPROVEMENT IN SAD-IRONS.

Specification forming part of Letters Patent No. 52,513, dated February 13, 1866.

*To all whom it may concern:*

Be it known that we, CHARLES BARRY and OLIVER W. PRESTON, Jr., of Corning, in the county of Steuben and State of New York, have invented a new and Improved Sad-Iron and Heater; and we do hereby declare that the following is a full, clear, and exact description thereof, which will enable those skilled in the art to make and use the same, reference being had to the accompanying drawings, forming part of this specification, in which—

Figure 1 is a vertical central section of our invention; Fig. 2, a detached plan or top view of the sad-iron.

Similar letters of reference indicate corresponding parts.

This invention relates to a new and improved sad-iron and heater, whereby the iron may be heated by gas, and a very portable and convenient arrangement obtained both as regards the heating and the use or manipulating of the iron.

The invention is an improvement upon and an adaptation to gas as a heating medium of a sad-iron and heater patented by us July 7, 1863, an oil-lamp being formerly used.

A represents a cylinder, the lower part of which is perforated with holes $a$ for the admission of air, and the upper end covered with wire-cloth $b$.

B is a horizontal tube, which is attached to and communicates with the lower part of the cylinder A, and has an elastic tube, C, fitted upon it, which is connected with a gas-burner. (See Fig. 1.)

D is a shield, which is connected to the cylinder A, and extends from a level with the bottom of the same to a considerable distance above its top, or as high up as the sad-iron when the latter is placed on the cylinder, as shown in Fig. 1.

The parts above described comprise the heating arrangement, the cylinder A being a gas-chamber into the lower part of which air enters, the gas being consumed at the upper surface of the wire-cloth $b$.

E represents the sad-iron, which is composed of a shell, $c$, having a handle, $d$, attached to it at one side. Within the shell $c$ a heater, F, is placed, which extends the whole length of the iron, and has a plate, G, at each end of it, and these plates serve as doors and cover openings $e$ at the front and rear ends of the iron when the iron is in use. The heater is allowed to slide freely within the iron, and by inverting the latter the heater will descend toward the top of the shell $c$, leaving the openings $e$ entirely uncovered, so that when the iron is placed on the cylinder A it will serve as a chimney, as shown clearly in Fig. 1, and the heat from the gas-flame will pass up through the iron, and both the heater and the bottom of the shell will be heated. In removing the heated iron from the cylinder A it is turned down to a horizontal position, and the heater will fall to the bottom of the shell, the plates or doors G covering the openings $e$. Thus it will be seen that the irons may be heated with the greatest facility and the heating device placed within convenient reach of the operator, the elastic tube C, which may be of any desired length, admitting of this.

Having thus described our invention, we claim as new and desire to secure by Letters Patent—

The heater F, provided with plates or doors G G at its ends, and fitted within the shell $c$ of the iron, substantially as and for the purpose herein set forth.

CHARLES BARRY.
OLIVER W. PRESTON, JR.

Witnesses:
J. S. ROBINSON,
DANIEL FITZPATRICK.